US011027199B2

(12) United States Patent
Holmes

(10) Patent No.: US 11,027,199 B2
(45) Date of Patent: **\*Jun. 8, 2021**

(54) SYSTEM AND METHOD FOR NETWORK COUPLED GAMING

(71) Applicant: Nvidia Corporation, Santa Clara, CA (US)

(72) Inventor: Stephen Holmes, Fort Collins, CO (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,701

(22) Filed: Feb. 10, 2020

(65) Prior Publication Data

US 2020/0179803 A1 Jun. 11, 2020

Related U.S. Application Data

(63) Continuation-in-part of application No. 14/939,965, filed on Nov. 12, 2015, now Pat. No. 10,630,773.

(51) Int. Cl.
*A63F 13/235* (2014.01)
*A63F 13/355* (2014.01)
(Continued)

(52) U.S. Cl.
CPC .......... *A63F 13/355* (2014.09); *A63F 13/235* (2014.09); *A63F 13/285* (2014.09); *A63F 13/327* (2014.09); *A63F 13/424* (2014.09); *G06F 21/32* (2013.01); *A63F 2300/406* (2013.01)

(58) Field of Classification Search
None
See application file for complete search history.

(56) References Cited

U.S. PATENT DOCUMENTS

| 5,557,724 A | 9/1996 | Sampate et al. |
| 6,279,029 B1 | 8/2001 | Sampat et al. |

(Continued)

FOREIGN PATENT DOCUMENTS

| CN | 101179385 A | * | 5/2008 |
| TW | 200513860 A | | 4/2005 |

(Continued)

OTHER PUBLICATIONS

APG Family Gaming; Nvidia Shield TV—Geforce Now Gaming; Sep. 12, 2015; https://www.youtube.com/watch?v=KrZ7Lj_bvFA; 1 pg.

*Primary Examiner* — Tramar Harper

(57) ABSTRACT

Embodiments of the claimed subject matter provide systems and methods for configuring and connecting a controller to a game streaming service. The system includes a plurality of input controls and a network controller configured for communicating with a game streaming service. The system further includes a processor coupled to the plurality of input controls and the network controller. The processor is configured communicate with the game streaming service to login to a game streaming service account and communicate input from the plurality of controls to the game streaming service. The system further includes a power source configured to provide power to the plurality of input controls, the network controller, and the processor.

20 Claims, 10 Drawing Sheets

(51) Int. Cl.
*A63F 13/327* (2014.01)
*A63F 13/285* (2014.01)
*G06F 21/32* (2013.01)
*A63F 13/424* (2014.01)

(56) References Cited

U.S. PATENT DOCUMENTS

| | | | |
|---|---|---|---|
| 7,107,245 B1* | 9/2006 | Kowalick | G06Q 20/10 |
| | | | 235/380 |
| 7,408,887 B2 | 8/2008 | Sengupta et al. | |
| 8,549,658 B2 | 10/2013 | Kolavennu et al. | |
| 2002/0045484 A1 | 4/2002 | Eck et al. | |
| 2002/0080399 A1 | 6/2002 | Nakagawa | |
| 2004/0266529 A1 | 12/2004 | Chatani | |
| 2006/0087981 A1 | 4/2006 | Sengupta et al. | |
| 2006/0156375 A1 | 7/2006 | Konetski | |
| 2007/0067446 A1 | 3/2007 | Jones et al. | |
| 2007/0067462 A1 | 3/2007 | Takeda | |
| 2007/0091861 A1 | 4/2007 | Gupta et al. | |
| 2007/0105623 A1 | 5/2007 | Tanaka et al. | |
| 2007/0218997 A1 | 9/2007 | Cho | |
| 2008/0137690 A1 | 6/2008 | Krantz et al. | |
| 2009/0074162 A1 | 3/2009 | Ryskamp | |
| 2009/0248793 A1 | 10/2009 | Jacobsson et al. | |
| 2010/0035686 A1* | 2/2010 | Nakashima | A63F 13/87 |
| | | | 463/36 |
| 2010/0317443 A1* | 12/2010 | Cook | A63F 13/12 |
| | | | 463/42 |
| 2011/0078332 A1 | 3/2011 | Poon | |
| 2011/0090305 A1 | 4/2011 | Ikeda et al. | |
| 2011/0222787 A1 | 9/2011 | Thiemert et al. | |
| 2011/0276157 A1 | 11/2011 | Wang et al. | |
| 2012/0212570 A1 | 8/2012 | Herz et al. | |
| 2013/0036231 A1* | 2/2013 | Suumaki | H04W 12/003 |
| | | | 709/228 |
| 2013/0148720 A1 | 6/2013 | Rabii | |
| 2013/0151693 A1 | 6/2013 | Baker et al. | |
| 2013/0173390 A1 | 7/2013 | Polo | |
| 2013/0179542 A1 | 7/2013 | Wang et al. | |
| 2013/0250761 A1 | 9/2013 | Shatzkamer et al. | |
| 2013/0290905 A1 | 10/2013 | LuVogt et al. | |
| 2013/0322251 A1 | 12/2013 | Kotecha et al. | |
| 2013/0332511 A1 | 12/2013 | Hala et al. | |
| 2014/0024457 A1 | 1/2014 | Justice et al. | |
| 2014/0029701 A1 | 1/2014 | Newham et al. | |
| 2014/0040364 A1 | 2/2014 | Baldwin et al. | |
| 2014/0040493 A1 | 2/2014 | Baldwin | |
| 2014/0122656 A1 | 5/2014 | Baldwin et al. | |
| 2014/0195912 A1 | 7/2014 | Odorovic et al. | |
| 2014/0213349 A1* | 7/2014 | Lin | G06F 21/31 |
| | | | 463/29 |
| 2014/0221087 A1 | 8/2014 | Huang et al. | |
| 2014/0253674 A1 | 9/2014 | Grondal et al. | |
| 2015/0273337 A1* | 10/2015 | Crowley | A63F 13/77 |
| | | | 463/29 |
| 2016/0043962 A1 | 2/2016 | Kim et al. | |
| 2017/0041977 A1 | 2/2017 | Yokoyama et al. | |
| 2017/0072307 A1 | 3/2017 | Perry et al. | |

FOREIGN PATENT DOCUMENTS

| | | |
|---|---|---|
| TW | 200629147 A | 8/2006 |
| WO | 2013095512 A1 | 6/2013 |

\* cited by examiner

800

```
┌─────────────────────────────────────────────────────────┐
│ Receiving Account Information For A Game Streaming Service From │
│         A Display Device Via A Network Connection        │
│                          802                             │
└─────────────────────────────────────────────────────────┘
                            │
                            ▼
┌─────────────────────────────────────────────────────────┐
│ Receiving Game Streaming Service Account Information From A │
│                      Game Controller                     │
│                          804                             │
└─────────────────────────────────────────────────────────┘
                            │
                            ▼
┌─────────────────────────────────────────────────────────┐
│ Receiving A Selection Of A Game Of The Game Streaming Service │
│                 From The Game Controller                 │
│                          806                             │
└─────────────────────────────────────────────────────────┘
                            │
                            ▼
┌─────────────────────────────────────────────────────────┐
│                 Sending Game Selection Images            │
│                          810                             │
└─────────────────────────────────────────────────────────┘
                            │
                            ▼
┌─────────────────────────────────────────────────────────┐
│                     Executing The Game                   │
│                          810                             │
└─────────────────────────────────────────────────────────┘
                            │
                            ▼
┌─────────────────────────────────────────────────────────┐
│ Sending Output Of The Game To The Display Device Via The │
│                    Network Connection                    │
│                          812                             │
└─────────────────────────────────────────────────────────┘
```

┌──────────────┐                              ┌──────────────┐
│ Sending An   │                              │              │
│Individualized│         ◇                    │ Send Audio   │
│Audio Stream  │◄──YES── Audio ──NO──────────►│ Stream To The│
│To The Game   │     Device Coupled?          │Display Device│
│ Controller   │         814                  │     818      │
│    816       │                              │              │
└──────────────┘                              └──────────────┘

```
                            │
                            ▼
┌─────────────────────────────────────────────────────────┐
│         Receiving An Input From The Game Controller      │
│                          820                             │
└─────────────────────────────────────────────────────────┘
                            │
                            ▼
┌─────────────────────────────────────────────────────────┐
│ Sending A Result Of The Input To The Display Device, Wherein The │
│          Result Comprises One Or More Images             │
│                          822                             │
└─────────────────────────────────────────────────────────┘
```

FIGURE 8

SYSTEM AND METHOD FOR NETWORK COUPLED GAMING

CROSS-REFERENCE TO RELATED APPLICATION

This application is a continuation of U.S. patent application Ser. No. 14/939,965, entitled "SYSTEM AND METHOD FOR NETWORK COUPLED CLOUD GAMING", filed on Nov. 12, 2015. The above-listed application is commonly assigned with the present application is incorporated herein by reference as if reproduced herein in its entirety.

RELATED U.S. APPLICATIONS

This application is related to the non-provisional patent application Ser. No. 14/092,872, entitled "METHOD AND SYSTEM FOR CLOUD BASED VIRTUALIZED GRAPHICS PROCESSING FOR REMOTE DISPLAYS," with filing date Nov. 27, 2013, which is hereby incorporated by reference in its entirety.

This application is related to the non-provisional patent application Ser. No. 14/092,818, entitled "HANDHELD GAMING CONSOLE," with filing date Nov. 27, 2013, which is hereby incorporated by reference in its entirety.

This application is related to the non-provisional patent application Ser. No. 13/727,357, entitled "VIRTUALIZED GRAPHICS PROCESSING FOR REMOTE DISPLAY," with filing date Dec. 26, 2012, which is hereby incorporated by reference in its entirety.

FIELD OF THE INVENTION

Embodiments of the present invention are generally related to cloud based applications and gaming.

BACKGROUND

As technology has advanced, computers have become increasingly faster and more capable of performing a variety of executing a variety of programs. One popular category of programs is gaming. Games have become increasingly advanced with higher resolution graphics demanding increasing advanced hardware. Conventional gaming systems involve a game console that is connected to a television for outputting video from the game and one or more controllers connected the game console. Given the advanced nature of modern gaming, game controllers and in particular, game console hardware is increasingly expensive to manufacture and purchase.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A need has arisen for a solution that allows game playing without the need to manufacture or purchase of individual expensive game console hardware. Accordingly, embodiments of the present invention reduce the cost of accessing game streaming services by removing the need for separate hardware for running a game streaming client. Embodiments include an internet connectable controller that is connected to a user's local network and thereby connected to the Internet and game streaming service. The game can then be streamed independently to an Internet connected display logged into the game streaming service without the need for a game console. For instance, the game can be independently streamed to a television, a tablet, a phone, or other display device that is capable of executing a game streaming client.

One embodiment of the present invention is directed to a system. The system includes a plurality of input controls and a network controller configured for communicating with a game streaming service. The network controller can be configured for receiving game feedback information from the game streaming service. The system further includes a processor coupled to the plurality of input controls and the network controller. The processor is configured communicate with the game streaming service to login to a game streaming service account and communicate input from the plurality of controls to the game streaming service. The system further includes a power source configured to provide power to the plurality of input controls, the network controller, and the processor. In some embodiments, the system is configured to communicate with the game streaming service without a gaming console.

The system can further include an audio interface configured for receiving input audio and outputting audio. The audio interface can be configured for coupling of at least one of a headset and a pair of headphones. The system can further include a memory for storing information associated with the game streaming service account and one or more networks. The system is further configured for receiving network information (e.g., network configuration information) to communicate with the game streaming service from a device comprising a display.

Another embodiment of the present invention is directed to a method of controlling a game. The method includes connecting a controller to a wireless access point. The wireless access point is communicatively coupled to a game streaming service. The method further includes sending game streaming service account information from the controller to the game streaming service and sending a selection of a game of the game streaming service. The method further includes receiving an input at the controller and sending the input from the controller via the wireless access point to the game streaming service. In some embodiments, the input comprises a button press on the controller. The method can further include receiving a voice command and sending the voice command to the game streaming service.

The method can further include sending an indicator indicating whether an audio device is coupled to the controller. The indicator indicates whether at least one of a headset or a pair of headphones are coupled to the controller. The method can further include receiving audio information in response the indicator and outputting the audio information to the audio device coupled to the controller. The audio information can be an individualized audio stream associated with the controller.

The method can further include connecting to a wireless network having an identifier matching a default network name and receiving network information associated with the wireless access point. The method can further include receiving the game streaming service account information and disconnecting from the wireless network having the identifier matching the default network name.

Another embodiment of the present invention is directed to a method for streaming a game. The method includes receiving account information for a game streaming service from a display device via a network connection and receiving game streaming service account information from a controller. The method further includes receiving a selection of a game of the game streaming service from the controller, executing the game, and sending output of the game to the display device via the network connection. In some embodiments, the game streaming service account information from the controller is sent from the controller to a wireless access point.

The method can further include receiving an input from the controller and sending a result of the input to the display device. The result can comprise include one or more images. The method can include sending an individualized audio stream to the controller. In some embodiments, the display device is an Internet connected television.

BRIEF DESCRIPTION OF THE DRAWINGS

The accompanying drawings are incorporated in and form a part of this specification. The drawings illustrate embodiments. Together with the description, the drawings serve to explain the principles of the embodiments:

FIG. 8 shows an exemplary computer implemented process for streaming a game, in accordance with various embodiments.

DETAILED DESCRIPTION

Figure 1:
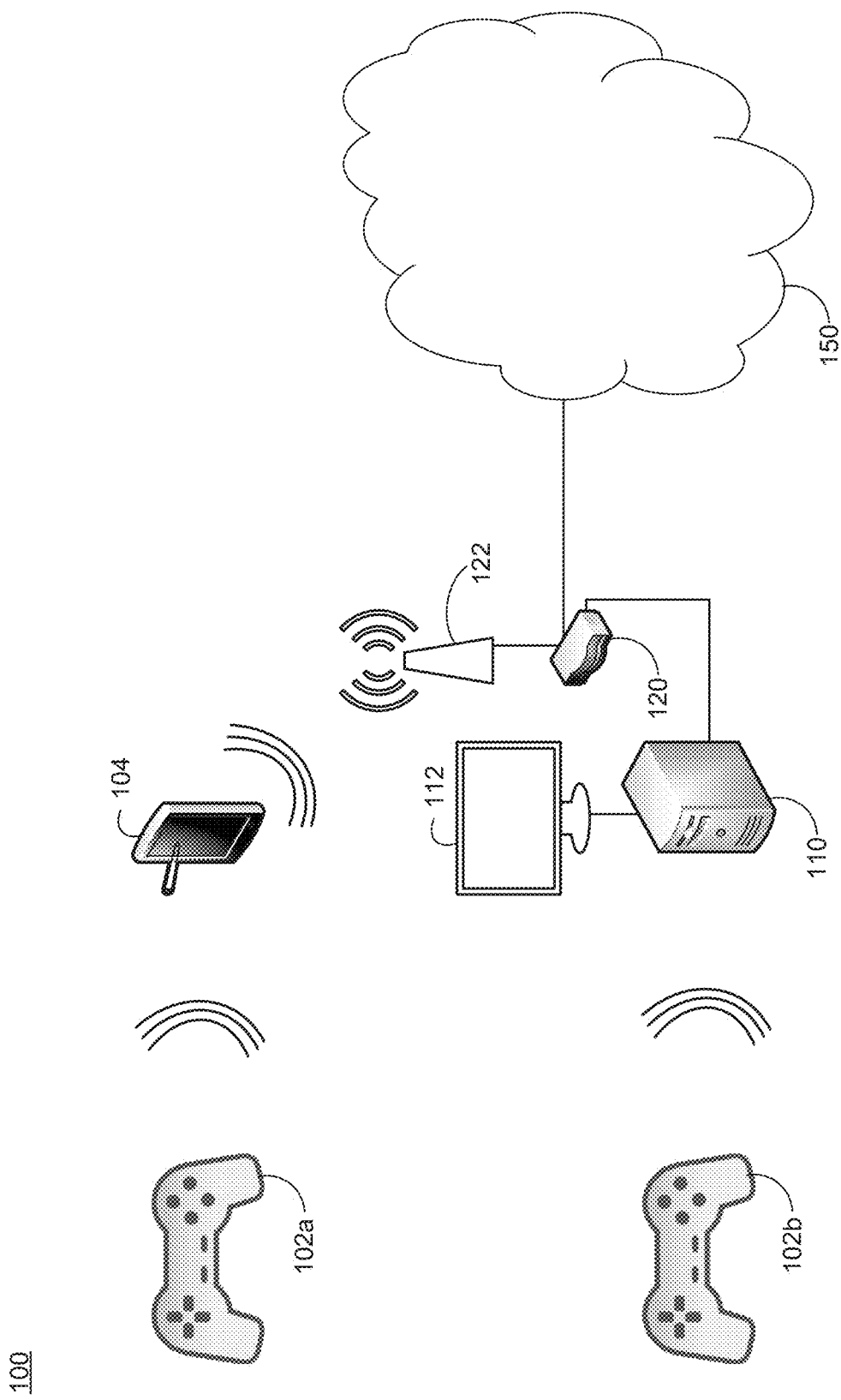
FIG. 1 shows an exemplary operating environment of a cloud based gaming system.

Reference will now be made in detail to embodiments of the claimed subject matter, a system and method for network coupled cloud gaming, examples of which are illustrated in the accompanying drawings. While the claimed subject matter will be described in conjunction with the preferred embodiments, it will be understood that they are not intended to limit these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to obscure unnecessarily aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "generating," "protecting," "receiving," "sending," "determining," "selecting," "initiating," "mapping," "translating," "accessing," "writing," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

System and Method for Network Coupled Gaming

Embodiments of the present invention reduce the cost of accessing game streaming services by removing the need for separate hardware for running a game streaming client. Embodiments include an internet connectable controller that is connected to a user's local network and thereby connected to the Internet and game streaming service. The game can then be streamed independently to an Internet connected display logged into the game streaming service without the need for a game console. For instance, the game can be independently streamed to a television, a tablet, a phone, or other display device that is capable of executing a game streaming client.

Embodiments of the present invention lower the latency between the user and the gaming service. Having the controller directly connected to the user's network eliminates the extra step of a processing by a local gaming console thereby reducing user input latency, audio input/output latency, and physical controller feedback latency.

Further, problems with audio routing and the limits of audio capabilities of the Operating System (OS) of the game console are eliminated. With a controller directly connected to the game streaming service, the handling of audio routing can be performed by the more capable game streaming service systems. Further, the user controller can be tied together with the audio streams so the input and output audio streams can be tailored to each individual user.

Embodiments are described with respect to a game streaming service but this is exemplary only and embodiments may be used with any gaming system, cloud based gaming, or type of application or content.

FIG. 1 shows an exemplary operating environment of a cloud based gaming system. FIG. 1 depicts an exemplary operating environment 100 with game controllers that communicate with local gaming console which sends information from the game controllers to a cloud based gaming system 150. The exemplary operating environment 100 includes game controllers 102a-b, a gaming tablet 104, a gaming console 110, a display device 112, a router 120, a wireless access point 122, and the cloud based gaming system 150.

The game controller 102a is a wireless game controller that is wirelessly connected to the gaming tablet 104. The tablet 104 is wirelessly connected to the wireless access point 122. The wireless access point 122 is connected to the router 120. The wireless access point 122 may be integrated into the router 120 or vice versa.

The game controller 102b is a wireless game controller that is wirelessly connected to the gaming console 110. The game controller 102b may be connected to the gaming console 110 by a wired connection. The gaming console 110 is connected to the router 120. The gaming console 110 is further connected to a display device 112. The display device 112 may be a television, monitor, etc.

The router 120 is connected to the cloud based gaming system 150 via the Internet. The tablet 104 and the gaming console 110 execute a game client which communicates with the cloud based gaming system 150. The router 120 routes communications between respective game streaming clients executing on the table 104 and the gaming console 110 and the game streaming server 150.

A user can start up a cloud based game through the tablet 104. The game executes on the cloud based gaming system 150 and output of the game is sent and displayed on a display screen of the tablet 104. The tablet 104 receives input from the user via the game controller 102a.

Alternatively, a user can start up the game client through the gaming console 110. The game executes in the cloud based gaming system 150 and the output of the game is sent and displayed on a display screen of the display device 112. The gaming console 110 receives input from the user via the game controller 102b.

The controllers 102a-b send button presses to the tablet 104 or the gaming console 110, both of which are executing respective game clients. Each game client then repackages the respective button press information and sends to the respective repackaged information to the cloud based gaming system 150. The game client also receives audio and other feedback (e.g., rumble information for vibrating the controller as directed by the game), repackages the information and sends it to the appropriate gaming controller. In both directions, the data is repackaged by the game client and then sent to the cloud based gaming system 150 or a controller thereby adding latency to the communication. Thus, the tablet 104 and the game console 110 add latency to communications to and from the game steaming service 150.

The tablet 104 and the gaming console 110 can have a simple audio input and audio output device, for instance, supporting only a single input and output audio stream. This may create problems when multiple audio-enabled controllers are used. For example, if multiple audio streams should be directed to/from the multiple controllers, the game client needs to be capable of routing the audio to/from the correct controller. Such capability and the associate complexity are beyond the abilities of the hardware and software of the game client.

FIGS. 2-6 illustrate example components used by various embodiments of the present invention. Although specific components are disclosed in FIGS. 2-6, it should be appreciated that such components are exemplary. That is, embodiments are well suited to having various other components or variations of the components recited in 2-6. It is appreciated that the components in FIGS. 2-6 may operate with other components than those presented, and that not all of the components of FIGS. 2-6 are required to practice embodiments of the present invention as described herein.

Figure 2:
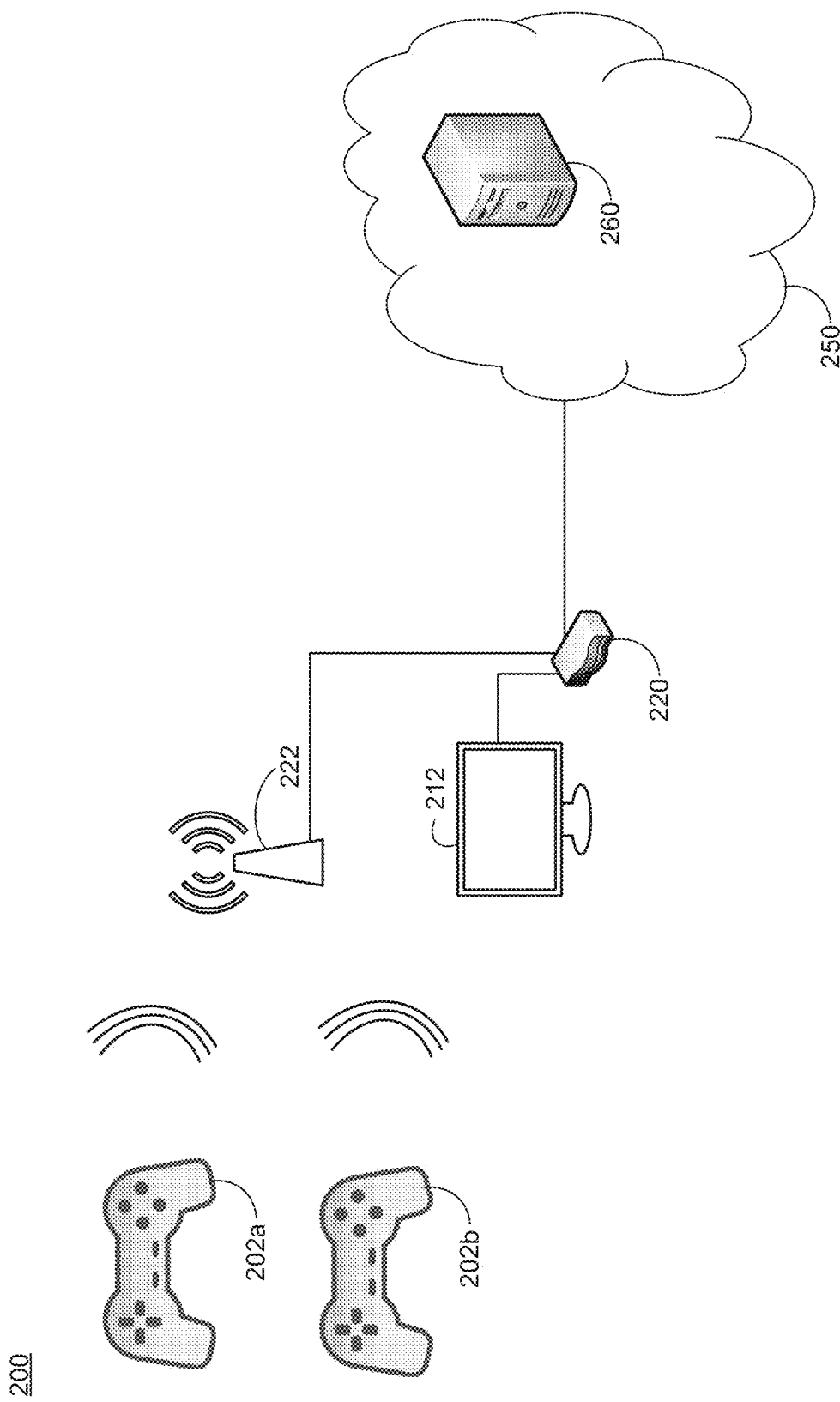
FIG. 2 shows exemplary operating environment of game streaming service with controllers and a display device coupled thereto, in accordance with various embodiments of the present invention.

FIG. 2 shows an exemplary operating environment of a game streaming service with controllers and a display device coupled thereto, in accordance with various embodiments of the present invention. FIG. 2 depicts an exemplary operating environment 200 with game controllers that communicate with a wireless access point and a game streaming service 250. The exemplary operating environment 200 includes game controllers 202a-b, a display device 212, a router 220, a wireless access point 222, the game streaming service 250, and a game streaming server 260.

The game controller 202a is a wireless game controller that is wirelessly connected to the wireless access point 222. In some embodiments, the game controller 202a may be coupled to the wireless access point 222 or the router 220 by a wired connection (e.g., Ethernet). The wireless access point 222 is communicatively coupled to the router 220. In some embodiments, the wireless access point 222 is integrated into the router 220 or vice versa.

The game controller 202b is a wireless game controller that is wirelessly connected to the wireless access point 222. The game controller 202b may be coupled to the wireless access point 222 or the router 220 by a wired connection (e.g., Ethernet). The controllers 202a-b may further have respective audio interfaces (e.g., audio input jacks, Bluetooth modules, etc.) configured for coupling of respective microphones, headsets, headphones, etc.

The game controllers 202a-b are configured for communicating with the game streaming service 250 without the need for repackaging of respective button information, audio information, and feedback information. The game controllers 202a-b are thus able to communicate controller information (e.g., button information, audio information, and feedback information) to the game streaming service 250 independent of a tablet (e.g., the tablet 104) or a gaming console (e.g., the gaming console 110). The game controllers 202a-b have improved responsiveness because the controller 202a-b communicate with the game streaming service 250 without the latency added by an intermediate device (e.g., the tablet 104 or the gaming console 110).

The display device 212 is coupled to the router 220. The display device 212 may be a television (TV), projector, monitor, etc. The display device 212 may include one or more speakers and/or audio jacks for outputting audio. The display device 212 may also have a microphone and/or one or ore audio jacks for audio input.

The display device 212 is configured for accessing and communicating with one or more types of networks (e.g., wired and/or wireless) and is configured for executing a game streaming client for the displaying and decoding of video and audio from the game streaming service 250. The display device 212 may execute a game streaming client which allows users to login to the game streaming service 250 to view the video output and/or hear audio output of a game. The display device 212 is further configured for allowing one or more users to log into the game streaming service 250. After the one or more users have logged into the game streaming service 250, the appropriate video and audio streams are sent to the display device 212. For example, if two users are logged into the game streaming service 250 via the display device 212, the game streaming service 250 sends split screen video and associated audio to the display device 212. The game streaming client executing on the display device 212 thus can display visual and audio feedback of the commands issued by the controllers 202a-b. The responsiveness of the video and audio is thus enhanced because the latency of having the video processed by an intermediate device (e.g., the game console 110) is removed. The game streaming server 260 may handle execution of the game for the game streaming service 250. The game streaming server 260 and the game streaming client executing on the display device 212 may communicate through a customized protocol designed for the low latency communication between the display device 212 and the game streaming server 260.

In some embodiments, the display device 212 may be a mobile device, e.g., a smartphone or a tablet, thereby allowing a user to play a game with the controller 202a at any location of the user's choosing, e.g., a coffee shop, library, etc.

The router 220 is coupled to the game streaming service 250 by one or more networks, including the Internet. The router 220 routes communications between the game streaming client executing on the display device 212 and the game streaming server 250. The router 120 further routes communications to and from the controllers 202a-b and the game streaming server 250.

Respective users of the controllers 202a-b login the controllers 202a-b into the game streaming service 250, as described below. The users further log into their respective accounts on the game streaming server 250 via the display device 212. The controllers 202a-b can then be used to select a game to be played via the display device 212. During the game play, button information and/or audio information from the controllers 202a-b is sent to the game streaming service 250 where the game is executing and the video and/or audio (e.g.; encoded video and/or audio) output of the game is sent the display device 212 for output. The game streaming service 250 further determines any feedback, for instance tactile feedback like rumble or vibration feedback, based on button information and/or audio information which is sent to the controllers 202a-b, e.g., when a player's car crashes in the game.

The game streaming service 250 includes one or more of a game streaming server 260. Embodiments of the present invention include the game streaming server 260 configured to communicate directly with the controllers 202a-b and the display device 212, e.g., without communicating through a gaming console (e.g., the gaming console 110). For example, each of the controllers 202a-b send individual packets to the game streaming server 206 instead of the communications from the game controllers 202a-b going to a gaming console (e.g., the gaming console 110) and then to the game streaming server 260. The game streaming server 260 and the game controllers 202a-b may communicate through a customized protocol designed for the low latency communication between the controllers 202a-b and the game streaming server 260.

Figure 3:
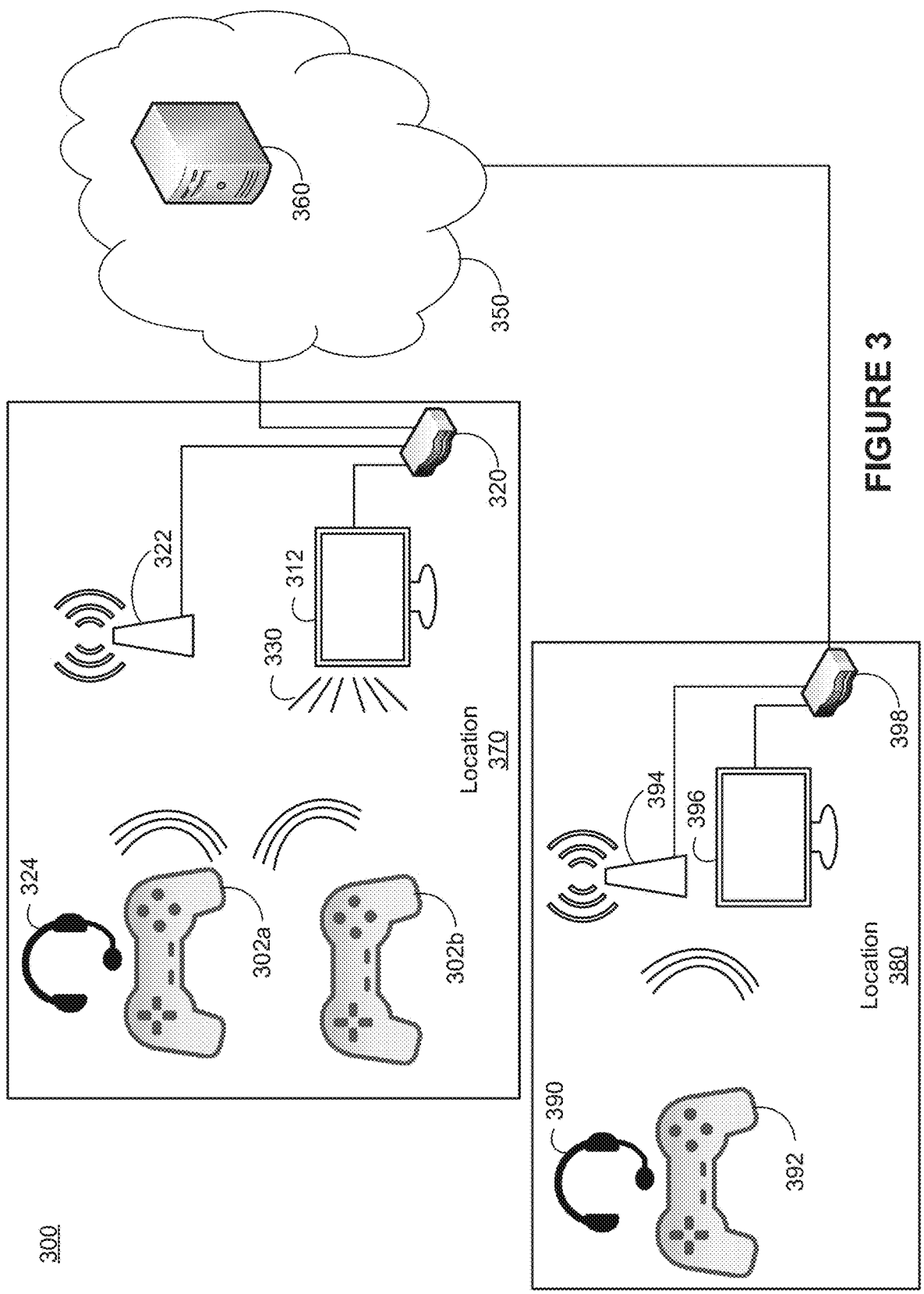
FIG. 3 shows an exemplary operating environment with multiple locations, in accordance with various embodiments of the present invention.

FIG. 3 shows an exemplary operating environment with multiple locations, in accordance with various embodiments of the present invention. FIG. 3 depicts a game being played using a game streaming service 350 at locations 370-380 and associated audio routing.

Controllers 302a-b, a headset 324, a wireless access point 322 a display device 312, and a router 320 are located at location 370. A controller 392, a headset 390, a wireless access point 394, a display device 396, and a router 398 are located at location 380. The wireless access points 322 and 394, the routers 320 and 398, the display devices 312 and 396, and the controllers 302a-b and 392 can operate in a substantially similar manner as similar elements as described above.

The headset 324 is coupled to the controller 302a. The headset 390 is coupled to the controller 392. The headsets 324 and 392 may be coupled to the controllers 302a and 392 via a wireless connection (e.g., Bluetooth) or wired connection (e.g., a Universal Serial Bus (USB) connection). The headsets 324 and 392 allow respective users to hear audio output from a game running on the game streaming service 350. The headsets 324 and 392 further allow respective users to talk to each other or other players via respective microphones and give voice commands to the game running on the game streaming service 350.

The game streaming service 350 supports the playing of a game among multiple users that may be at one or more locations. The locations 370 and 380 may be different houses, places of business, dormitories, convention centers, etc. Locations 307 and 380 may be geographically close (e.g., on the same block or street) or distant (e.g., across country or across the planet).

Figure 4:
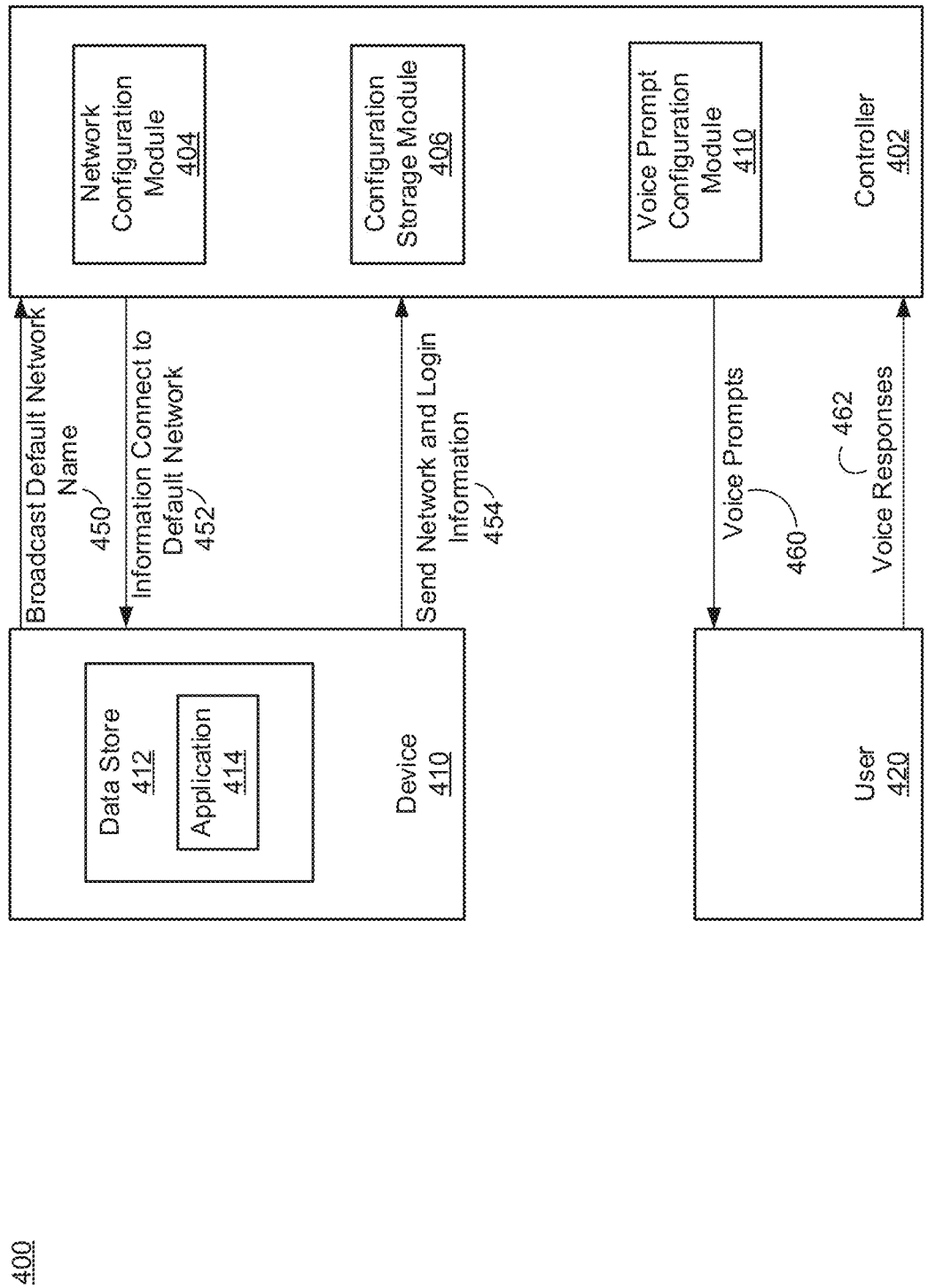
FIG. 4 shows exemplary communications for configuring a controller, in accordance with various embodiments of the present invention.

The respective users of the controllers 302a-b login to the game streaming service 350 with the display device 312 (e.g., using a television remote control) and configure their respective controllers 302a-b for communicating with the game streaming service 350 as described with respect to FIG. 4. For example, the user of the controller 392 logs into the game streaming service 350 with display device 396 and configures the controller 392 for communicating with the game streaming service 350 as described with respect to FIG. 4. The respective users of the controllers 302a-b and 390 further log into their game streaming accounts of the game streaming service 350 with their respective controllers.

The game streaming service 350 further supports individual audio streams for each player. The controllers 302a-b and 392 support sending one or more respective indicators and/or information to the game streaming service 350 that a respective audio device, e.g., a headset, head phones, a microphone, etc., is coupled to the respective controller. For example, the indicator may indicate whether headphones only are coupled to the controller, whether microphone only is coupled to the controller, or both headphones and microphone of a headset are coupled to the controller.

A game streaming server 360 of the game streaming service 350 receives the indicators of audio devices coupled to the controller. The game streaming server 360 determines, based on the respective indicators of the audio devices coupled to the controllers, how and where audio streams will be routed.

Some operating systems, e.g., the Android operating system, available from Google, Inc., of Mountain View, Calif., are designed around having a single audio input and audio output. For example, if four users are playing a racing game that is displayed on a single television and in different parts of the tracks, the television will be sent an audio mashup or combination of the four respective audio tracks. In contrast, having one controller for each of the four players, each with respective audio jacks and respective communication with the game streaming service 350, allows for a personalized audio experience. For example, if player one is coming up behind player three, player one will hear the audio of player three coming up behind player one. Similarly, player three can hear the audio of player one being in front of player three instead of the audio streams being combined together. As such, if a gaming console (e.g., the game console 110) runs the Android operating system, an associated game service will combine all of the audio streams into a single stream and the gaming console will not have the opportunity or ability to split up the audio streams.

The game streaming server 360 (and thereby the game streaming service 350) is configured to send individual audio streams for each respective controller and each display device. Each of the controllers 302a-b and 392 and the display devices 312 and 396 may support audio input and output.

As shown in FIG. 3, the controllers 302a and 392 have coupled headsets 324 and 394, respectively, and transmit indicators that headsets are coupled thereto to the game streaming service 350. The game streaming server 360 can then determine that individual respective audio streams are to be sent to the controllers 302a and 394. If both controllers 302a-b did not have coupled headsets, the audio sent to the display device 330 would be a combined audio output of each of the respective audio streams.

In some embodiments, due to the headset 390 being coupled to the controller 392, the game streaming server 360 determines that an audio stream does not need to be sent to the display device 396. The video stream of the game may thus be sent to the display device 396 without an audio stream. This allows the player using the controller 392 to play without disturbing other people at the location 380 because the audio stream for the controller 392 is through the headset 390 and not out of the speakers of the display device 396.

The controller 302b transmits an indicator that there is not a headset or other audio device coupled to the controller 302b. Based on the indicator from the controller 302b, the game streaming server 360 determines that the audio stream associated with the controller 302b should be sent to the display device 312. The display device 312 then outputs the audio stream as audio 330, e.g., out of one or more speakers. In some embodiments, the display device 312 may be sent a combined audio stream.

It is appreciated that if there was an audio device coupled to the controller 302b, the game streaming server 360 could have the audio stream for the controller 302b sent to the controller 302b instead of the display device 312. This would thereby allow the players of the game at the location 370 to play without disturbing others because the audio streams for each of the controllers 302a-b would be going through respective coupled headsets and there could be no audio output of speakers of the display device 312.

Based on the audio device indicators, the game streaming service 350 can further support voice input from the controllers 302a-b and 392. For example, the game streaming service 350 can listen to the respective microphone audio streams from the controllers 320a and 392 for audio or voice commands. If the display device 312 has a microphone coupled thereto, the game streaming service 350 can receive audio or voice commands from the user of the controller 302b. Based on the voice commands, the game streaming server 360 can determine to change the display output sent to the display devices 312 and 396. For example, if the user of the controller 302a says the command "map," the game streaming server 360 may analyze and perform voice recognition and in response update the portion of the video displayed on the display device 312 for the controller 302a to display a map while the portion of video displayed for the controller 302b continues to show the game. As another example, the user of controller 302a could say the command "infrared mode," and the portion of the video displayed on the display device 312 for the controller 302a would be updated to show heat signatures of the characters of the game.

In some embodiments, the audio jacks of a controller may be used to send a voice based password to the game streaming service 350. For example, the user of the controller 302a may provide a voice print password which is authenticated by the game streaming service 350 prior to accepting commands to enter a game from the controller 302a. This can add a layer of security to the controller and prevent unauthorized access to the account associated with the controller.

During game play, the game streaming server 360 may also determine tactile feedback for the controllers 302a-b and 392. For example, based on a car hitting a wall that is being controlled with the controllers 302a, the streaming gaming server 360 can determine and send a rumble signal which is sent to the controller 302a to vibrate the controller 302a.

FIG. 4 shows exemplary communications for configuring a controller, in accordance with various embodiments of the present invention. FIG. 4 depicts an exemplary communication sequence for configuring a controller 402 to communicate with a game streaming service 450. The controller 402 may be configured using a device 410, e.g., a smartphone, tablet, computer, etc., or via a voice commands from a user 420.

In some embodiments, the controller 402 is configured (e.g., by default) to search for a default controller configuration Wi-Fi network, e.g., with a Service Set Identifier (SSID) of "Controller Network Setup," under certain conditions. The controller 402 may search for the default controller configuration Wi-Fi network in response to a user pressing a network configuration button, a reset button, or other button combination. In some embodiments, the controller 402 may search for the default controller configuration Wi-Fi network when no known network if is found. A network configuration module 404 configures the controller 402 to connect to the default network or a local network based on received network information, as described herein.

A user downloads an application 414 to a data store 412 of the device 410 (e.g., cellphone, tablet, computer, etc.) which when executed configures the device 410 to act as a wireless access point for a Wi-Fi network with a default network name 450, e.g., with an SSID of "Controller Network Setup." The device 410 broadcasts the default network name 450 and associated information for allowing a controller to connect to the wireless network setup by the device 410.

The controller 402 recognizes the default network name 450 and sends information to connect to default network 452. In response to a connection with the controller 402, the application 414 presents the user with one or more screens and input fields for configuring the controller 402. In some embodiments, the controller 402 is coupled to the device via a wired connection, e.g., USB. The application 414 allows the user to enter network configuration information (e.g., network name or SSID), wireless key or password, Dynamic Host Configuration Protocol (DHCP) or static Internet Protocol (IP) address information, subnet, gateway, etc., and game account or game streaming service account information (e.g., login and password). In some embodiments, the application 414 presents the user with a list of networks visible to the device 410 and prompts the user for a password to be used by the controller 402 to access a selected network. If the user is at a business (e.g., a coffee shop or hotel), the application 414 may be used to accept any license agreements that are necessary for the controller 402 to access the local network of the business.

The network configuration and game streaming service account information 454 is then sent to the controller 402. The network configuration module 404 configures the controller 402 based on the received the network configuration and game streaming service account information. The network configuration module 404 stores the network configuration and login information 454 in the configuration storage module 408. The configuration storage module 408 may be used by the controller 402 to access to networks that have previously been accessed by the controller 402.

If connected to the default configuration network, upon configuring itself the controller 402 can disconnect from the default configuration network and connect to network associated with the network configuration information. In response to connecting the local network based on the network configuration information, the controller 402 connects to and logs into the game streaming service associated with the game streaming account information (e.g., the game streaming service 250). For example, a user may use his or her cell phone, when at a friend's house, to configure his or her controller to access the friend's local wireless network.

In some embodiments, the network configuration information can include a Media Access Control (MAC) address (e.g., the MAC address of the device being used to configure the device) that the controller 402 is to use for communicating with the network specified in the network configuration information. This use of the provided MAC address by the controller 402 can handle situations, e.g., in a hotel, where a user is limited in the number of devices he or she can connect to a local network.

In some embodiments, the network configuration information and/or game streaming account information can be input into the controller 402 with voice commands using voice recognition. For example, a user could plug in a headset into the controller 402, push a configuration button (e.g., or reset configuration button) and be provided voice prompts 460 from the voice prompt configuration module 410. The user can respond by providing voice responses including a wireless network SSID, wireless password, and game streaming account information. Based on the voice responses 462, the voice prompt configuration module 410 performs voice recognition and provides the output to the network configuration module 404 which then configures the controller 4021. Voice recognition may thus be used in place of the application 414 executing on the device 410 coupled to the controller 402.

Figure 5:
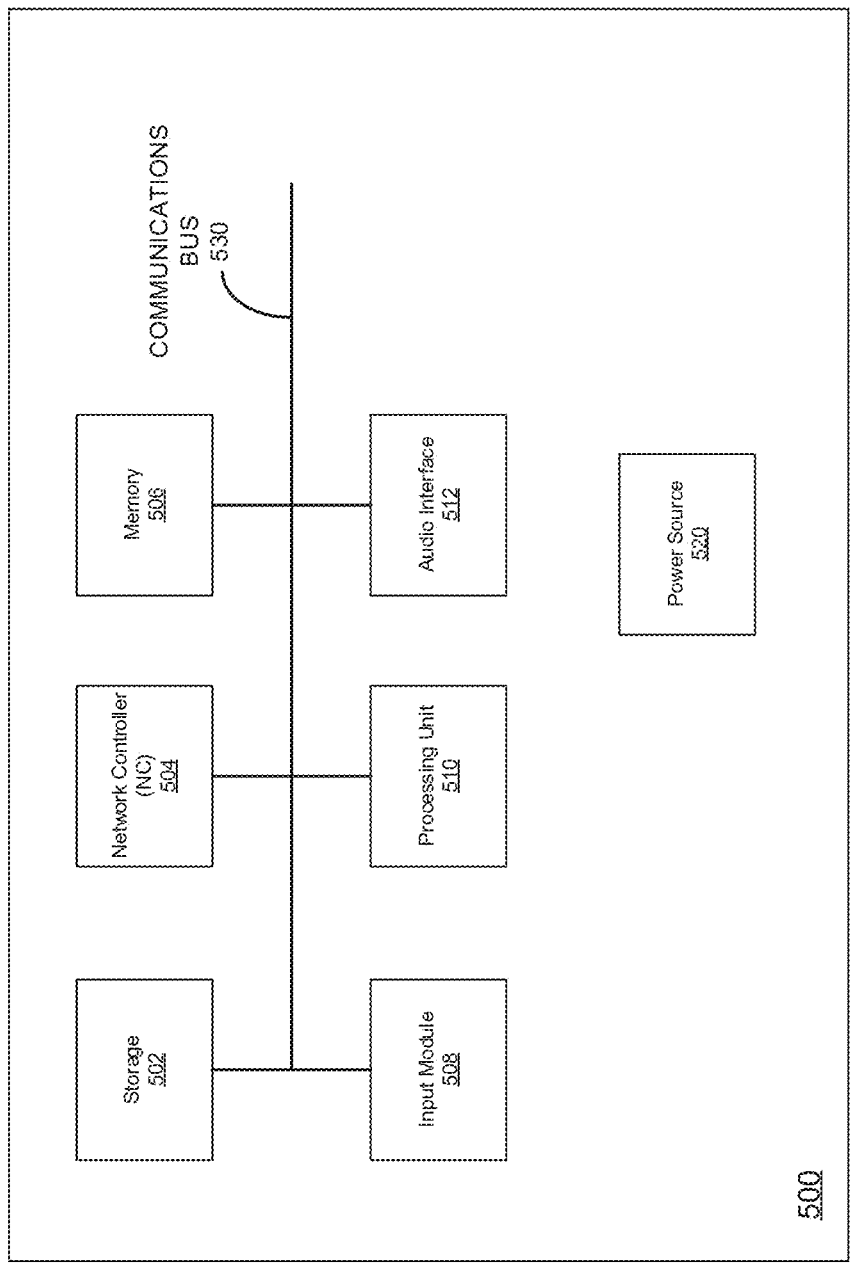
FIG. 5 shows exemplary components of a controller in accordance with various embodiments of the present invention.

FIG. 5 shows exemplary components of a controller in accordance with various embodiments of the present invention. FIG. 5 depicts exemplary components of a controller supporting audio input and output, tactile feedback, button input, and direct communication with a network and a game streaming service (e.g., the game streaming service 250). The controller 500 is thus able to take advantage of the lower latencies available through the direct network and Internet connection.

FIG. 5 further depicts the components of an exemplary controller in accordance with embodiments of the present invention providing the execution platform for certain hardware-based and software-based functionality. Although specific components are disclosed in controller 500, it should be appreciated that such components are examples. That is, embodiments of the present invention are well suited to having various other components or variations of the components recited in controller 500. It is appreciated that the components in controller 500 may operate with other components other than those presented, and that not all of the components of controller 500 may be required to achieve the goals of controller 500.

The controller 500 includes a storage 502, a network controller (NC) 504, a memory 506, an input module 508, a processing unit 510, an audio interface 512, a communications bus 530, and a power source 520. The power source 520 provides power to controller 500 and may be a DC or AC power source. The communications bus 530 communicatively couples the components of controller 500.

The processing unit 510 and the NC 504 can be integrated into a single integrated circuit die and processing unit 510 and NC 504 may share various resources, such as instruction logic, buffers, functional units and so on, or separate resources may be provided for processing and general-purpose operations. In some embodiments, the processing unit 510 and/or the NC 504 may be programmable circuits or processors, e.g., a field-programmable gate array (FPGA). Some embodiments may comprise a firmware update that is configured to allow the controller 500 to communicate with a game streaming service via the NC 504 (e.g., via a wireless access point and the Internet) instead of with a gaming console (e.g., the gaming console 110). The firmware update would thus enable a controller to communicate with a wireless network instead of a gaming console. The firmware may allow the controller to search for the aforementioned default controller network configuration Wi-Fi network.

The storage 502 is configured for storing game streaming service login information, network information, and/or software for execution on the controller 500. The storage 502 may include nonvolatile memory and further be configured to download firmware or microcode for updating the processing unit 510 and/or the NC 504. The storage 502 can include storage for storing a list of known or previously configured communication networks. For example, the storage 502 may include a list of SSID and key pairs and network settings (e.g., DHCP settings) of wireless networks that the controller has been configured to access. This thereby allows the controller 500 to access the communication networks with associated information in the storage 502 whenever the controller is in range of the communication networks.

The network controller (NC) 504 is coupled to communications bus 530 and is configured for communication with one or more pieces of network equipment including a wireless access point (e.g., the wireless access point 222 and a game streaming service (e.g., the game streaming service 250). It is appreciated that the network controller 504 in combination with other components are configured for communicating with a game streaming service (e.g., the game streaming service 250) without the need for a gaming console (e.g., the game console 110). The network controller 504 may use the memory 506 in order to send and receive communications and/or provide received data to other components of the controller 500.

The input module 508 allows entry of user commands into controller 500 which may include, but are not limited to, one or more buttons, one or more joysticks, one or more navigation pads, one or more directional pads, keyboards (e.g., QWERTY), up/down buttons, left/right buttons, trigger buttons, select buttons, mode buttons, and the like.

The processing unit 510 receives commands via input module 508 and may receive audio via the audio interface 512. In some embodiments, the processing unit 510 is a Central Processing Unit (CPU). The processing unit 510 can control a variety of operations including, but not limited to, voice recognition, voice processing, and sending voice commands for processing (e.g., by the game streaming service 250), receiving and sending commands from the input module 508, handling communications with a game streaming service via the network controller 504, configuration of the network controller 504 for communication with the game streaming service, and logging into a game streaming service. The processing unit 510 can use the memory 506 in order to perform or carry out the aforementioned functions and/or operations.

The audio interface 512 is configured for coupling audio equipment including, but not limited to, a headset, headphones, a microphone, etc. The audio interface 512 may provide received voice commands or voice input to processing unit 510 and output game audio to a headset or headphones. It is appreciated that audio interface 512 may output to audio equipment integrated within controller 500, e.g., an integrated speaker.

Figure 6:
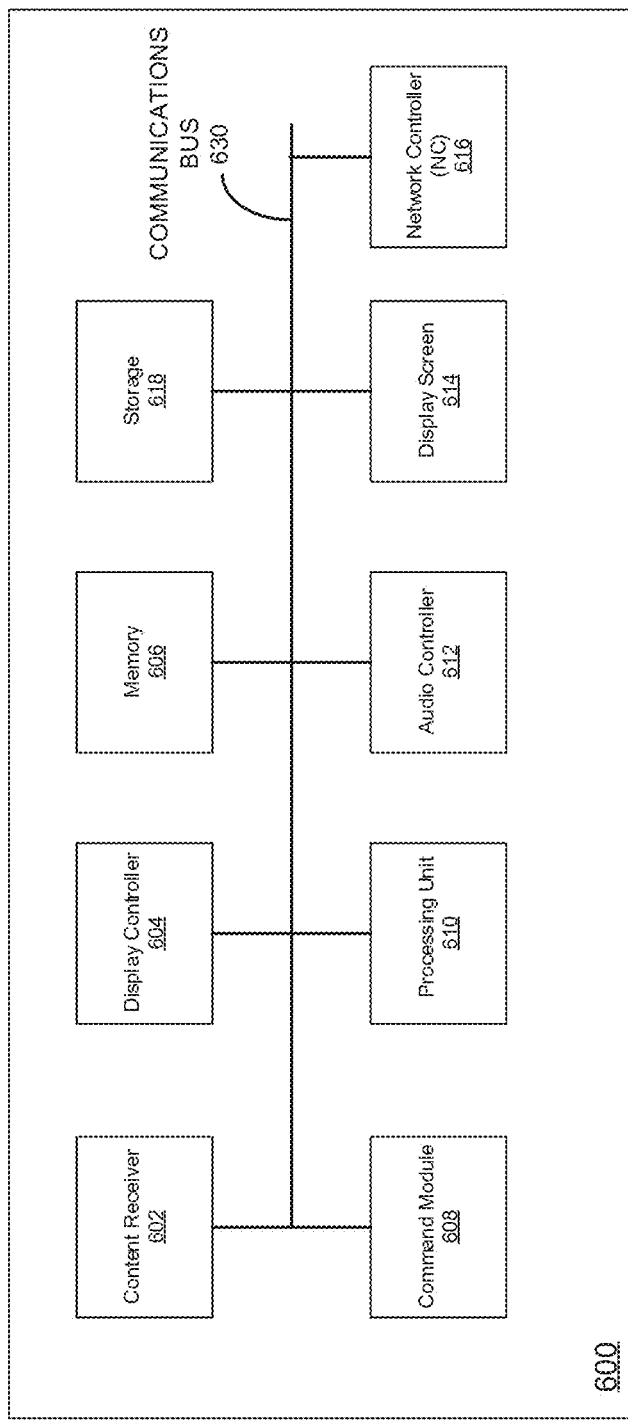
FIG. 6 shows exemplary components of a display device in accordance with various embodiments of the present invention.

FIG. 6 shows exemplary components of a display device in accordance with various embodiments of the present invention. Although specific components are disclosed in a display device 600 it should be appreciated that such components are examples. That is, embodiments of the present invention are well suited to having various other components or variations of the components recited in display device 600. It is appreciated that the components in display device 600 may operate with other components than other those presented, and that not all of the components of display device 600 may be required to achieve the goals of display device 600. It is appreciated that embodiments of display device 600 include a variety of Internet capable display devices, including but not limited to televisions, Cathode Ray Tube (CRT) displays, computer monitors, Liquid Crystal Displays (LCDs), plasma displays, projection displays, projectors, etc.

FIG. 6 depicts an exemplary display device and associated components. The display device 600 includes a content receiver 602, a display controller 604, a memory 606, a command processor 608, a processing unit 610, an audio controller 612, a display screen 614, and a network controller (NC) 616. The communications bus 630 communicatively couples the components of the display device 600.

The content receiver 602 receives content for display by the device 600. The content receiver 602 may receive signals including content from a variety of sources including, but not limited to, computers, computer networks, portable devices, set top boxes, over the air broadcasts, cable broadcasts, satellite broadcasts, Digital versatile Discs (DVDs), Blu-ray discs, Digital Video Broadcasting-Handheld (DVB-H), Digital Multimedia Broadcasting (DMB), Digital Video Broadcasting Satellite services to Handhelds (DVB-SH), Digital Audio Broadcasting (DAB), Digital Video Broadcasting IP Datacasting (DVB-IPDC), and Internet Protocol Television (IPTV), etc.

The display controller 604 controls the display screen 614 of the display device 600. The display screen 614 can be a CRT, a LCD, a plasma display, projection based display, and a Digital Light Processing (DLP) display, etc., configured for output of video and/or images (e.g., in conjunction with audio controller 612).

The memory 606 can be volatile or non-volatile memory used by various components of the display device 600. The memory 606 can be used by the network controller 616 in order to send and receive communications and/or provide received data to other components of the controller 500. The memory 606 can be used by the processing unit 510 in order to perform or carry out the aforementioned functions and/or operations, and execute a game streaming client for displaying game output and outputting game audio.

The command module 608 receives commands (e.g., via a remote control). The command module 608 may receive commands via a variety of receivers including, but not limited to, infrared receivers and radio frequency receivers. The commands may have been issued via remote control (e.g., infrared) and can be used to configure the display device 600 for access to one or more networks, including the Internet, and a game streaming service (e.g., account information associated with the game streaming service 250).

The processing unit 610 is configured for executing an application for configuring access to a game streaming service including logging into the game streaming service and outputting audio and video associated with a game being played by the game streaming service. In some embodiments, the application executed by the processing unit 610 is configured to decode and output audio and video streamed from a game streaming service (e.g., the game streaming service 250).

Audio controller 612 controls audio output for display device 600 including a variety of outputs including, but not limited to, 2, 2.1, 3.1, 5.1, 6.1, 7.1, and 8.1 channel audio. The audio content may be received via content receiver 602 and/or the network controller 616 from a game streaming service (e.g., the game streaming service 250). It is appreciated that audio controller 612 may output to audio equipment integrated within display device 600.

The storage 618 is configured for storing game streaming service account (e.g., login and password) information, network information, and/or software for execution on the display device 600. The storage 618 is configured for storing an application for logging into the game streaming service and outputting audio and video associated with a game being played by the game streaming service. The storage 618 may be non-volatile memory and further be configured to download firmware or microcode for updating the processing unit 610 and/or the NC 616. The storage 618 can include storage for storing a list of known or previously configured communication networks which can be used to automate connection thereto.

The network controller (NC) 616 is coupled to communications bus 530 and is configured for communication with one or more networks (e.g., a wireless network or wired network) and a game streaming service (e.g., the game streaming service 250). It is appreciated that the network controller 616 in combination with other components are configured for receiving and outputting audio and video associated with a game streaming service (e.g., the game streaming service 250) without the need for a gaming console (e.g., the gaming console 110). The network controller 616 may use the memory 606 in order to send and receive communications and/or provide received data to other components of the display device 600.

The processing unit 610 and the NC 616 can be integrated into a single integrated circuit die and processing unit 610 and NC 616 may share various resources, such as instruction logic, buffers, functional units and so on, or separate resources may be provided for video and/or audio processing and general-purpose operations. In some embodiments, the processing unit 610 and/or the NC 616 may be programmable circuits or processors, e.g., a field-programmable gate array (FPGA).

Figure 7:
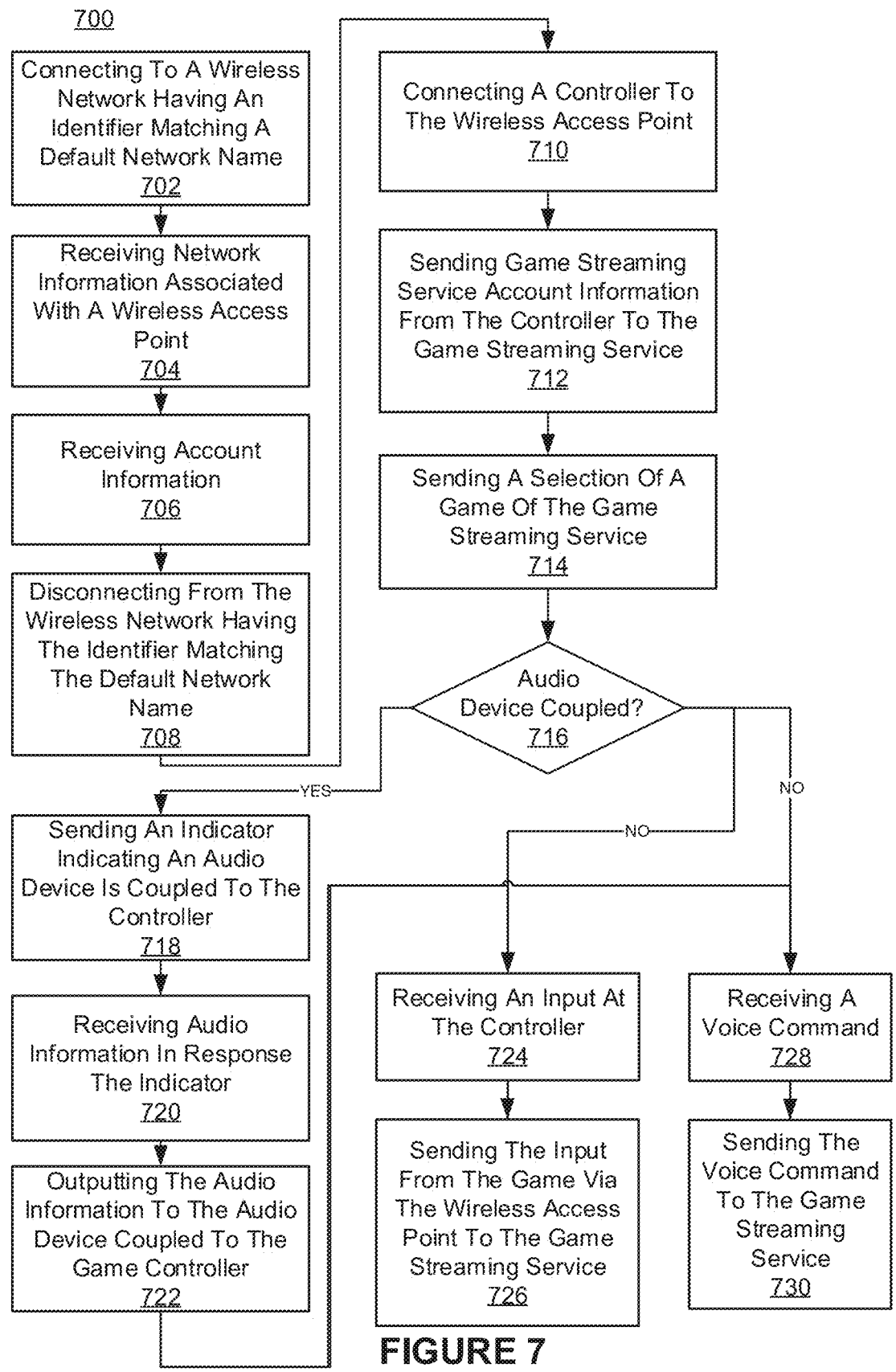
FIG. 7 shows an exemplary controller implemented process for configuring a controller and controlling a game, in accordance with various embodiments.
Figure 9:
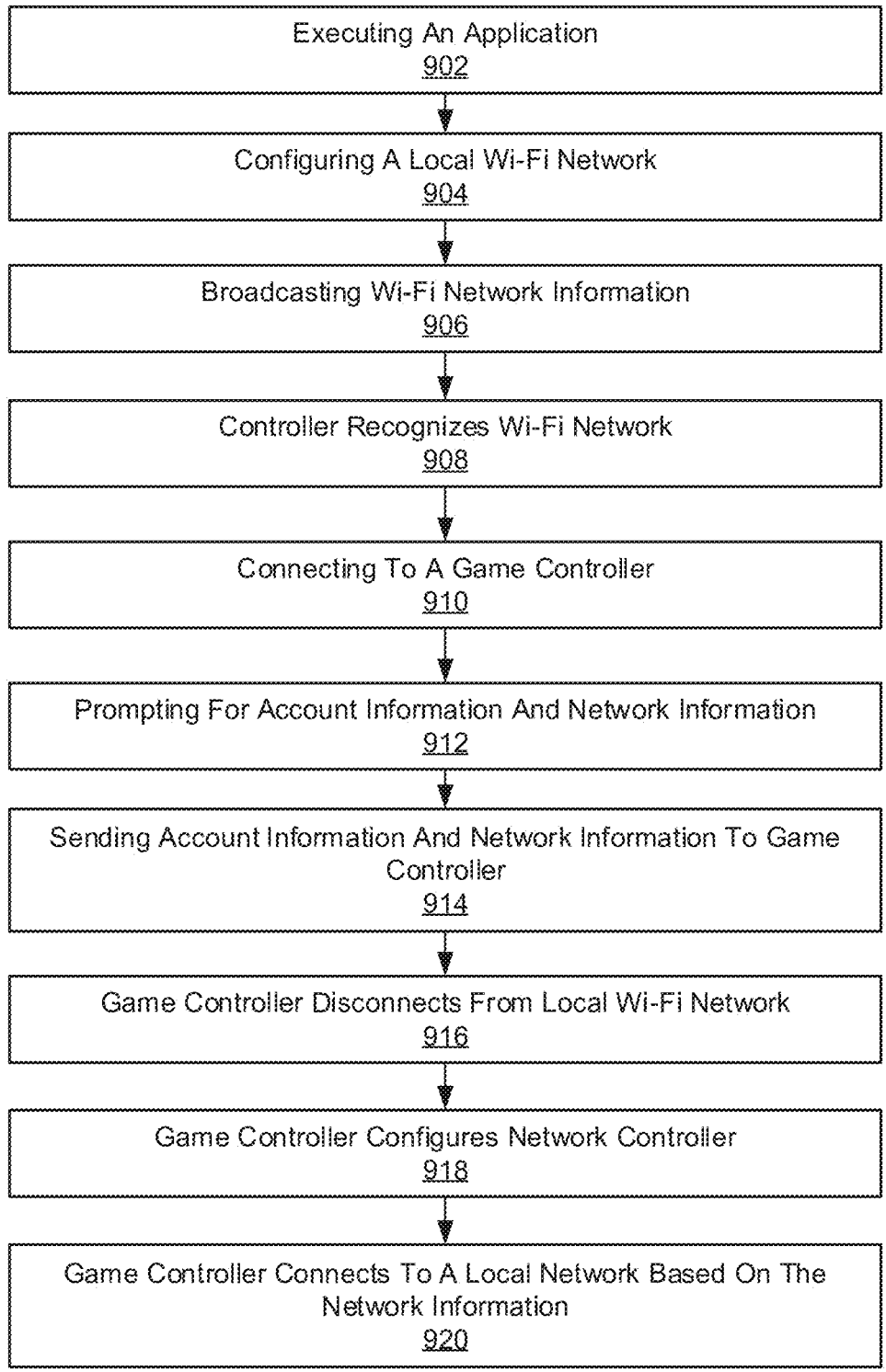
FIG. 9 shows an exemplary process for configuring a controller, in accordance with various embodiments.

With reference to FIGS. 7-9, flowcharts 700-900 illustrate example functions used by various embodiments for a controller directly communicating with a game streaming service, as described herein. Although specific function blocks ("blocks") are disclosed in flowcharts 700-900, such steps are exemplary. That is, embodiments are well suited to performing various other blocks or variations of the blocks recited in flowcharts 700-900. It is appreciated that the blocks in flowcharts 700-900 can be performed in an order different than presented, and that not all of the blocks in flowcharts 700-900 need be performed.

FIG. 7 shows an exemplary controller implemented process for configuring a controller and controlling a game, in accordance with various embodiments. FIG. 7 depicts a process 700 during which a controller is configured, connected to a game streaming service, and a game is launched and played.

At block 702, a wireless network is connected to having an identifier matching a default network name, by a controller. As described herein, the controller may automatically connect to a wireless network setup by a device, e.g., smartphone, tablet, or computer, configured to function as a wireless access point.

At block 704, network information associated with a wireless access point is received. The network information can be received from the device after a user is prompted for the network information, as described herein.

At block 706, account information is received. The account information can be game streaming account information received from the device after a user was prompted for account information, as described herein.

At block 708, the wireless network having the identifier matching the default network name is disconnected from by the controller. The controller can disconnect from the wireless network having the identifier matching the default network name in order to reconfigure its network settings based on the received network information, as described herein.

At block 710, the controller connects to the wireless access point (e.g., the wireless access point 222). The wireless account point is communicatively coupled to one or more networks, including the Internet, and the game streaming service (e.g., the game streaming service 250), as described herein.

At block 712, the game streaming service account information is sent from the controller to the game streaming service. As described herein, the game streaming service account information is sent from the controller to the game streaming service without a gaming console (e.g., the gaming console 110).

At block 714, a game selection is sent to the game streaming service. As described herein, the controller can be used to select a game from the game streaming service to be launched, via the controller and a display device (e.g., the display device 212).

At block 716, whether an audio device is coupled to the controller is determined. As described herein, a controller can detect whether an audio device, e.g., a headset or headphones, is coupled to an audio interface or jack of the controller. If an audio device is detected, block 718 can be performed. If an audio device is not detected, blocks 724 or 728 may be performed.

At block 718, an indicator indicating that an audio device is coupled the controller is sent. The indicator can further indicate the type of audio device, e.g., headset or headphones, and the capabilities of the audio device, e.g., recording ability using a microphone, as described herein.

At block 720, audio information is received in response to the indicator, as described herein. The audio information can be an individualized audio stream for the game character associated with the controller. For example, the individualized audio stream may include a screeching sounds of a car that is being controlled with the controller.

At block 722, the audio information is output to the audio device coupled to the controller. For example, the audio information can be output to headphones of a headset.

At block 724, an input is received at the controller. The input may a button press, joystick information, etc., from a user, as described herein.

At block 726, the input received at the controller is sent via the wireless access point to the game streaming service. As described herein, the input from a user is sent to the game streaming service to control a character or other aspect of the game executing that is on the game streaming service.

At block 728, a voice command is received. The voice command may be received via a microphone, e.g., of a headset, coupled to the controller, as described herein. Blocks 724 and/or 728 may then be performed as further input is received during the playing of the game.

At block 730, the voice command is sent to the game streaming service. The game streaming service can then respond to the voice command by manipulating a character and/or updating images and/or video that are sent to the display device. Blocks 724 and/or 728 may then be performed as further input is received during the playing of the game.

FIG. 8 shows an exemplary computer implemented process for streaming a game, in accordance with various embodiments. FIG. 8 depicts a process 800 of streaming a game to a display device and receiving input from a controller connected to a network, as described herein. The display device and the controller are each individually logged into the game streaming service. The process 800 may be performed by one or more computing systems of a game streaming service (e.g., the game streaming service 250).

At block 802, account information for a game streaming service is received from a display device via network connection. The display device may be an internet connected and capable television or projector, as described herein. The account information may be received at a game streaming server (e.g., game streaming server 260).

At block 804, game streaming account information is received from a controller. The game streaming account information can be received from the controller after the controller has received account information and network information, as described herein.

At block 806, one or more a game selection screens are sent. The display device may be sent video and/or images to allow a user to navigate using the controller to select a game, as described herein.

At block 808, a selection of a game of the game streaming service is received from the controller. The selection can be based on input from the controller being used to select a game displayed on the display device, as described herein.

At block 810, the game is executed. In response to the selection of the game, the game is executed or launched on the game streaming service, as described herein.

At block 812, output the game is sent to the display device via the network connection. The output of the game is streamed from the game streaming service to the display device, as described herein.

At block 814, whether an audio device is coupled to a controller is determined. The determination can be based on whether the controller sends an indicator that an audio device, e.g., headset or headphones, are coupled to the controller. If an audio device is coupled to the controller, block 816 is performed. If an audio device is not coupled to the controller, block 818 is performed.

At block 816, an individualized audio stream is sent to the controller. The individualized audio stream can be sent including audio only for the user using the controller and be for output through the headset or headphones coupled to the controller.

At block 818, an audio stream is sent to the display device. If there are more than two or more players playing the game, the audio stream may be a combined stream, as described herein. It is appreciated that combined audio and individualized audio can be sent to one or more locations, as described herein.

At block 820, an input is received from the controller. The input can be from a button, joystick, voice command, etc., from a controller, as described herein, and received at a game streaming server.

At block 822, a result of the input is sent to the display device. The game streaming server can send the result of the input, e.g., a game character moving, to the display device for display to a user.

FIG. 9 shows an exemplary process for configuring a controller, in accordance with various embodiments. FIG. 9 depicts of process 900 of configuring network and game streaming service account information on a controller with another device (e.g., smartphone, tablet, computer, etc.). In some embodiments, a first portion of process 900 may be performed by a smartphone and a second portion performed by a controller.

At block 902, an application is executed. The application can be downloaded or loaded onto a smartphone, tablet, computer, or the like and executed, as described herein.

At block 904, a local Wi-Fi network is configured. The local Wi-Fi network can be configured for a smartphone, tablet, computer, or the like to act as a wireless access point, as described herein.

At block 906, Wi-Fi network information is broadcast. The Wi-Fi information that is broadcast can include a default SSID of "Controller Configuration Network," as described herein.

At block 908, the controller recognizes the Wi-Fi network. In some embodiments, the controller can recognize the Wi-Fi network based on the Wi-Fi network having a default SSID of "Controller Configuration Network," as described herein.

At block 910, the controller is connected. The controller can connect to the Wi-Fi network with the default SSID of "Controller Configuration Network," as described herein. In some embodiments, blocks 910 and 914 may be performed over a wired connection (e.g., USB).

At block 912, prompts for account information and network information are presented. For example, a screen of a smartphone, a tablet, a computer, or the like may display a form with one or more fields for a user to enter or select account information associated with a game streaming service and network information associated with a local network communicatively coupled with a game streaming service.

At block 914, the account information and the network information are sent to the controller. The account information and the network information can be sent to the controller over a wireless or wired connection, as described herein.

At block 916, the controller disconnects from the local Wi-Fi network. The controller can disconnect from the default controller configuration network in order to configure itself for coupling to a local network communicatively coupled to the game streaming service, as described herein.

At block 918, the controller configures its network controller. The controller configures itself for coupling to a local network communicatively coupled to the game streaming service, as described herein.

At block 920, the controller connects to a local network based on the network information. This allows the controller to then connect to the game streaming service, send the account information to the game streaming service, and launch a game.

Figure 10:
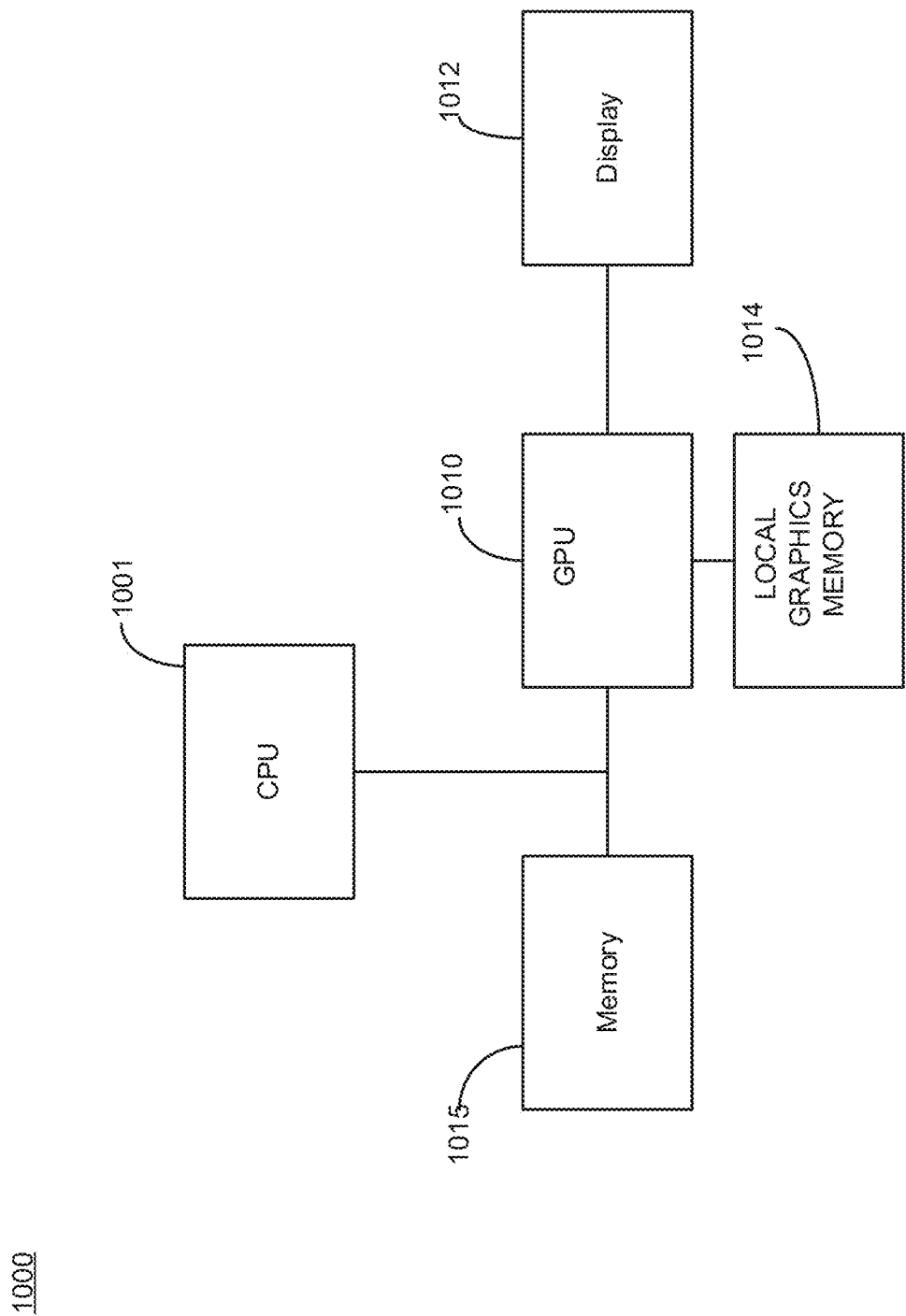
FIG. 10 shows a computer system in accordance with various embodiments.

FIG. 10 shows exemplary computer system 1000 in accordance with one embodiment of the present invention. Computer system 1000 depicts the components of a generic computer system in accordance with embodiments of the present invention providing the execution platform for certain hardware-based and software-based functionality. In some embodiments, a game streaming service (e.g., the game streaming service 250) includes one or more of exemplary computer system 1000. In general, computer system 1000 comprises at least one CPU 1001, a system memory 1015, and at least one graphics processor unit (GPU) 1010. The CPU 1001 can be coupled to the system memory 1015 via a bridge component/memory controller (not shown) or can be directly coupled to the system memory 1015 via a memory controller (not shown) internal to the CPU 1001. The GPU 1010 may be coupled to a display 1012. One or more additional GPUs can optionally be coupled to system 1000 to further increase its computational power. The GPU(s) 1010 is coupled to the CPU 1001 and the system memory 1015. The GPU 1010 can be implemented as a discrete component, a discrete graphics card designed to couple to the computer system 1000 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 1014 can be included for the GPU 1010 for high bandwidth graphics data storage.

The CPU 1001 and the GPU 1010 can also be integrated into a single integrated circuit die and the CPU and GPU may share various resources; such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 1010 can also be implemented in, and performed by, a suitably equipped CPU 1001. Additionally, while embodiments herein may make reference to a GPU, it should be noted that the described circuits and/or functionality can also be implemented and other types of processors (e.g., general purpose or other special-purpose coprocessors) or within a CPU.

In one exemplary embodiment, GPU 1010 is operable for General-purpose computing on graphics processing units (GPGPU) computing. GPU 1010 may execute Compute Unified Device Architecture (CUDA) programs and Open Computing Language (OpenCL) programs. GPU 1010 may thus be used for a variety of computing applications including simulations of molecular dynamics, computational fluid dynamics, reservoir simulations, and finite structural problems. It is appreciated that the parallel architecture of GPU 1010 may have significant performance advantages over CPU 1001.

System 1000 can be implemented as, for example, a desktop computer system or server computer system having a powerful general-purpose CPU 1001 coupled to a dedicated graphics rendering GPU 1010. In such an embodiment, components can be included that add peripheral buses, specialized audio/video components, IO devices, and the like. Similarly, system 1000 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 1000 can also be implemented as a "system on a chip" (SoC), where the electronics (e.g., the components 1001, 1015, 1010, 1014, and the like) of a computing device are wholly contained within a single integrated circuit die. Examples include a hand-held instrument with a display, a car navigation system, a portable entertainment system, and the like.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method performed on a game controller, comprising:
    making a wireless connection to a computing device;
    receiving network information associated with a wireless access point from the computing device via the wireless connection;
    disconnecting from the computing device;
    connecting to the wireless access point based on the received network information to communicate through a communication network with a game streaming service;
    communicating with the game streaming service with respect to a game streaming service account;
    receiving user input from a plurality of input controls; and
    communicating the user input to the game streaming service via a first connection through the communication network that is separate from a second connection used by the game streaming service to communicate to a display device.

2. The method of claim 1, wherein the computing device is a smartphone, tablet, or computer.

3. The method of claim 1, wherein the display device is a television, a monitor, a projector, a tablet, or a smartphone.

4. The method of claim 1, further comprising:
    communicating game streaming service account information to the game streaming service.

5. The method of claim 1, further comprising:
    receiving audio information from the game streaming service; and
    outputting audio information.

6. The method of claim 1, further comprising:
    receiving audio information from a user; and
    communicating the audio information to the game streaming service.

7. The method of claim 6, wherein the audio information is a voice print password.

8. The method of claim 1, further comprising:
    receiving game feedback information from the game streaming service, wherein the game feedback information is tactile, rumble, or vibration feedback; and
    causing the game controller to output physical feedback to a user based on the feedback information.

9. The method of claim 1, further comprising:
    storing, in the game controller, information associated with the game streaming service account.

10. The method of claim 1, wherein communicating the user input to the game streaming service comprises providing the received user input to the game streaming service without repackaging the user input.

11. A method performed on a game controller, comprising:
    making a wireless connection to a computing device;
    receiving network information associated with a wireless access point from the computing device via the wireless connection;
    disconnecting from the computing device;
    connecting to the wireless access point based on the received network information to communicate through a communication network with a game streaming service;
    communicating with the game streaming service with respect to a game streaming service account;
    receiving user input from a plurality of input controls; and
    communicating the user input to the game streaming service through the communication network to cause a game to be executed based on the user input and to cause an output of the game to be displayed on a display device that is in communication with the game streaming service.

12. The method of claim 11, wherein the computing device is a smartphone, tablet, or computer.

13. The method of claim 11, wherein the display device is a television, a monitor, a projector, a tablet, or a smartphone.

14. The method of claim 11, further comprising:
    communicating game streaming service account information to the game streaming service.

15. The method of claim 11, further comprising:
    receiving audio information from the game streaming service; and
    outputting audio information.

16. The method of claim 11, further comprising:
    receiving audio information from a user; and
    communicating the audio information to the game streaming service.

17. The method of claim 16, wherein the audio information is a voice print password.

18. The method of claim 11, further comprising:
    receiving game feedback information from the game streaming service, wherein the game feedback information is tactile, rumble, or vibration feedback; and
    causing the game controller to output physical feedback to a user based on the feedback information.

19. The method of claim 11, further comprising:
   storing, in the game controller, information associated with the game streaming service account.

20. The method of claim 11, wherein communicating the user input to the game streaming service comprises providing the received user input to the game streaming service without repackaging the user input.

\* \* \* \* \*